United States Patent
Ghadge et al.

(10) Patent No.: US 10,951,478 B2
(45) Date of Patent: Mar. 16, 2021

(54) USER PLANE GROUP

(71) Applicant: Cisco Technology, Inc., San Jose, CA (US)

(72) Inventors: Amit Ghadge, Pune (IN); Nithin Chitta, Pune (IN); Sanjeev Panem Jaya, Pune (IN); Anand Arun Alshi, Pune (IN)

(73) Assignee: CISCO TECHNOLOGY, INC., San Jose, CA (US)

(*) Notice: Subject to any disclaimer, the term of this patent is extended or adjusted under 35 U.S.C. 154(b) by 126 days.

(21) Appl. No.: 16/172,013

(22) Filed: Oct. 26, 2018

(65) Prior Publication Data
US 2019/0334775 A1   Oct. 31, 2019

Related U.S. Application Data

(60) Provisional application No. 62/664,910, filed on Apr. 30, 2018.

(51) Int. Cl.
*G06F 15/173* (2006.01)
*H04L 12/24* (2006.01)
*H04W 12/04* (2021.01)

(52) U.S. Cl.
CPC ......... *H04L 41/0893* (2013.01); *H04W 12/04* (2013.01)

(58) Field of Classification Search
CPC ......... H04L 45/22; H04L 1/22; H04L 5/0058; H04L 5/0032; H04L 5/0087; H04L 5/0096
(Continued)

(56) References Cited

U.S. PATENT DOCUMENTS

| 5,014,261 A | 5/1991 | Shinbashi et al. |
| 6,999,783 B2 | 2/2006 | Toyryla et al. |

(Continued)

FOREIGN PATENT DOCUMENTS

| WO | 2016150623 A1 | 9/2016 |
| WO | 2017125179 A1 | 7/2017 |

(Continued)

OTHER PUBLICATIONS

3GPP Organizational Partners, "3rd Generation Partnership Project; Technical Specification Group Services and System Aspects; Telecommunication management; Charging management; Packet Switched (PS) domain charging (Release 15)", 3GPP TS 32.251 V15.3.0, Jun. 2018, 187 pages.

(Continued)

*Primary Examiner* — Wing F Chan
*Assistant Examiner* — Andrew Woo

(57) ABSTRACT

Various embodiments disclosed herein provide a method for grouping user planes in 4G/5G packet cores to simplify user plane discovery and registration. In some embodiments the method includes detecting a plurality of User Planes (UPs), grouping a first subset of the UPs into a first UP group, in which each UP in the first UP group is associated with a first set of features, and allocating the first UP group to a first network service based on the first set of features associated with the first UP group and a first set of requirements of the first network service. The method further includes grouping a second subset of the plurality of UPs into a second UP group, in which each of the second UP group is associated with a second set of features and allocating the second UP group to a second network service of a plurality of network services.

20 Claims, 6 Drawing Sheets

(58) Field of Classification Search
USPC .................................................. 709/201, 203
See application file for complete search history.

(56) References Cited

U.S. PATENT DOCUMENTS

| | | | |
|---|---|---|---|
| 7,092,354 | B2 | 8/2006 | Jensen |
| 7,423,962 | B2 * | 9/2008 | Auterinen ............... H04L 45/00 370/216 |
| 9,832,659 | B2 | 11/2017 | Yi et al. |
| 10,069,904 | B2 | 9/2018 | Singh et al. |
| 2003/0117983 | A1 | 6/2003 | Ton et al. |
| 2010/0220656 | A1 | 9/2010 | Ramankutty et al. |
| 2011/0235505 | A1 * | 9/2011 | Eswara ................... H04L 43/10 370/221 |
| 2013/0121298 | A1 * | 5/2013 | Rune ................... H04W 72/085 370/329 |
| 2013/0344887 | A1 | 12/2013 | Wachter |
| 2015/0124585 | A1 | 5/2015 | Sahin et al. |
| 2016/0353462 | A1 | 12/2016 | Jiang et al. |

FOREIGN PATENT DOCUMENTS

| | | |
|---|---|---|
| WO | 2018001522 A1 | 1/2018 |
| WO | 2018009340 A1 | 1/2018 |

OTHER PUBLICATIONS

3GPP Organizational Partners, "3rd Generation Partnership Project; Technical Specification Group Services and System Aspects; General Packet Radio Service (GPRS) enhancements for Evolved Universal Terrestrial Radio Access Network (E-UTRAN) access (Release 15)", 3GPP TS 23.401 V15.5.0, Sep. 2018, 410 pages.

3GPP Organizational Partners, "3rd Generation Partnership Project; Technical Specification Group Services and System Aspects; Architecture enhancements for control and user plane separation of EPC nodes; Stage 2 (Release 15)", 3GPP TS 23.214 V15.4.0, Sep. 2018, 92 pages.

3GPP Organizational Partners, "3rd Generation Partnership Project; Technical Specification Group Services and System Aspects; Study on control and user plane separation of EPC nodes (Release 14)", 3GPP TR 23.714 V14.0.0, Jun. 2016, 87 pages.

3GPP Organizational Partners, "3rd Generation Partnership Project; Technical Specification Group Core Network and Terminals; Interface between the Control Plane and the User Plane Nodes; Stage 3 (Release 15)", 3GPP TS 29.244 V15.3.0, Sep. 2018, 189 pages.

3GPP Organizational Partners, "3rd Generation Partnership Project; Technical Specification Group Core Network and Terminals; Study on Control and User Plane Separation of EPC Nodes (Release 14)", 3GPP TR 29.844 V14.0.0, Jun. 2017, 52 pages.

3GPP Organizational Partners, "3rd Generation Partnership Project; Technical Specification Group Services and System Aspects; Study on Architecture for Next Generation System (Release 14)", 3GPP TR 23.799 V14.0.0, Dec. 2016, pp. 1-174.

3GPP Organizational Partners, "3rd Generation Partnership Project; Technical Specification Group Services and System Aspects; Study on Architecture for Next Generation System (Release 14)", 3GPP TR 23.799 V14.0.0, Dec. 2016, pp. 175-349.

3GPP Organizational Partners, "3rd Generation Partnership Project; Technical Specification Group Services and System Aspects; Study on Architecture for Next Generation System (Release 14)", 3GPP TR 23.799 V14.0.0, Dec. 2016, pp. 350-522.

International Search Report and Written Opinion in counterpart International Application No. PCT/US2019/029073 dated Jul. 31, 2019 16 pages.

Eantc AG, "Huawei's Cloud-based Broadband Network Gateway Solution Performance, Resiliency and Functionality", Mar. 2018, 15 pages.

* cited by examiner

ICSR for CP

1:1 Redundancy for UP

N:M Redundancy for UP

USER PLANE GROUP

PRIORITY CLAIM

This application claims priority to U.S. provisional patent application No. 62/664,910 filed on Apr. 30, 2018, the contents of which are hereby incorporated by reference.

TECHNICAL FIELD

The present disclosure generally relates to user planes, and in particular, to grouping user planes in 4G/5G packet cores in order to simplify user plane discovery and/or registration.

BACKGROUND

Since the launch of LTE (Long-Term Evolution) networks, Evolved Packet Core (EPC), the converged packet core for 3GPP/Non-3GPP access types and an all-IP mobile packet core, has undergone multiple evolutions. These evolutions have been done without impacting the way the network has defined EPC architecture. However, the adoption of virtualization/cloud computing has led EPC to undergo several evolutions to keep pace with requirements of the mobile operators.

EPC was introduced as the next generation of evolved packet core for the 2G/3G packet core. Mobility Management Entity (MME), Serving Gateway (SGW) and Packet Data Network Gateway (PGW) are some of the network functions of the EPC network. Initial LTE deployments worldwide were done with network functions deployed as monolithic applications on physical purpose-built hardware. The traditional 3GPP 2G/3G and EPC architecture allows for easy migration from one generation to the next, with minimal disruption to the back-end systems.

BRIEF DESCRIPTION OF THE DRAWINGS

So that the present disclosure can be understood by those of ordinary skill in the art, a more detailed description may be had by reference to aspects of some illustrative embodiments, some of which are shown in the accompanying drawings.

Figure 1:
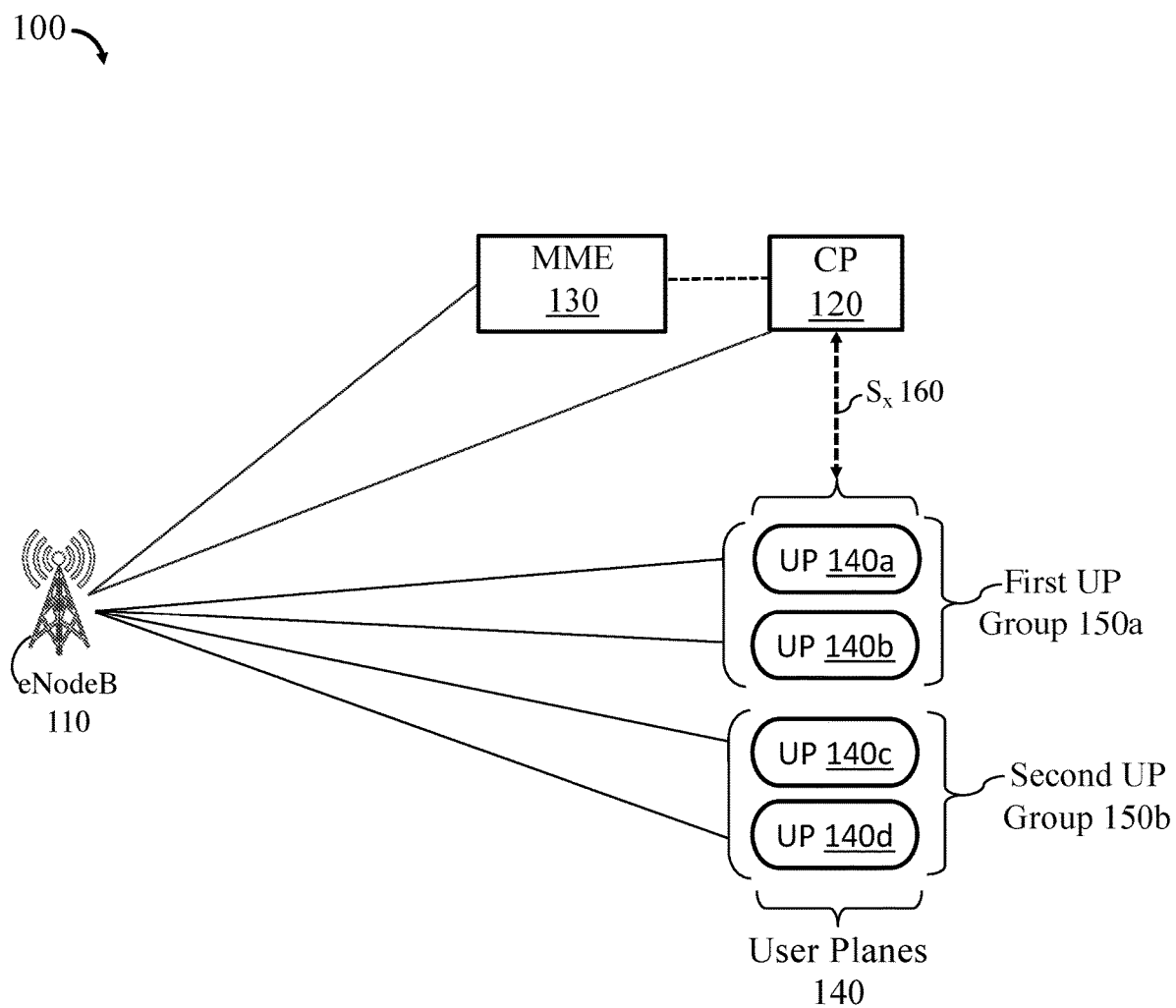
FIG. 1 is a block diagram of a system configured to group detected User Planes (UPs) based on a set of features in accordance with some embodiments.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION OF EXAMPLE EMBODIMENTS

Numerous details are described in order to provide a thorough understanding of the example embodiments shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example embodiments described herein.

OVERVIEW

Various embodiments disclosed herein enable a network operator to detect a plurality of User Planes (UPs) and group a first subset of the UPs into a first UP group. In some embodiments, a method is performed by a device including a non-transitory memory and a processor coupled with the non-transitory memory. In some embodiments, the method includes detecting a plurality of user planes (UPs). In some embodiments, the method includes grouping a first subset of the plurality of UPs into a first UP group. In some embodiments, each UP in the first UP group is associated with a first set of features. In some embodiments, the method includes allocating the first UP group to a first network service of a plurality of network services based on the first set of features associated with the first UP group and a first set of requirements of the first network service.

EXAMPLE EMBODIMENTS

Control and User Plane Separation (CUPS) is the evolution of 3GPP EPC architecture in which SGW and PGW are separated out into their constituent User Plane and Control Plane functions. This enables more flexibility and independent scalability suitable for Virtual Network Function SDN (VNF/SDN) implementation, while maintaining the mobility control provided by GPRS Tunneling Protocol (GTP), which is retained between the evolved nodes. Separating control and user plane for applications helps in dynamic scaling, programmability and manageability of the network. During the evolution from 2G/3G-MPC to LTE-EPC, the Control Plane (CP) has been separated from the User Plane (UP). In this architecture, MME handles signaling-plane functions and SGW and PGW forward data on the UP. However, from the perspective of each network element, the control and forwarding functions are not completely separate. Most EPC Gateway devices have combined forwarding, session anchoring and application processing integrated in the same modules. This architecture difference has caused some poor performances such as poor universality, prolonged R&D cycles, significantly increased testing, inefficient network access, and un-scalable O&M.

Hence, in order to address these challenges, the CP and UPs of the gateway need to be further separated. Further, the user-plane functions may need to be geographically distributed into physically separate locations.

Various embodiments disclosed herein enable a network operator to detect a plurality of User Planes (UPs) and group a first subset of the UPs into a first UP group, in which each UP in the first UP group is associated with a first set of features. Disclosed system of UP group selection further allocates the first UP group to a first network service (such as VoLTE and Internet). This is performed based on the first set of features associated with the first UP group and a first set of requirements of the first network service. For example, VoLTE has a low latency requirement, therefore the first UP group is allocated to an Access Point Name (APN) for VoLTE if the first UP group can satisfy the low latency requirement.

The first set of features includes a geographical location of the UPs, capability or capacity of a hardware, APN association of UPs, redundancy mode, etc. For example, the redundancy mode may be 1:1 or N:M. According to some embodiments of the present application, a network operator can group the plurality of UPs into UP groups on a CP.

The method may further enable the network operator to group a second subset of the plurality of UPs into a second UP group, in which each of the second UP group is associated with a second set of features. Subsequently, the network operator may allocate the second UP group to a second network service of a plurality of network services. In various embodiments, the disclosed method may further assign a secret key to a registered UP in a UP group to register to a CP. In various embodiments, the plurality of UPs can be on a server, a virtual machine or a distributed cloud platform.

In some embodiments, the network operator may group UPs based on their capability and capacity. The network operator may further reserve certain UPs for certain applications. For example, each of an IP Multimedia Subsystem (IMS), Internet, or Internet of Things (IoT) could have different UP groups. The method may provide the network operator with different redundancy modes for different UP groups based on the needs of the applications. For example, if a network operator has one group of UPs for IMS and another one for Internet to keep IMS and Internet traffic separate, then the network operator can configure 1:1 redundancy for UPs in IMS UP group for better resiliency, while configuring redundancy type as N:M for the Internet UP group.

FIG. 1 is a block diagram of a network system 100 in accordance with some embodiments. While pertinent features are shown, those of ordinary skill in the art will appreciate from the present disclosure that various other features have not been illustrated for the sake of brevity and so as not to obscure more pertinent aspects of the example embodiments disclosed herein. To that end, as a non-limiting example, the network system 100 may include an evolved node 110, a Control Plane (CP) 120, a Mobility Management Entity (MME) 130 associated with the CP 120, and a plurality of User Planes (UPs) 140 including different UPs 140a, 140b, 140c, and 140d. In some embodiments, the evolved node 110, the CP 120, and the plurality of UPs 140 may communicate with each other via a network (not shown). In various embodiments, the network system 100 may be part of a virtualized mobile services platform. In some embodiments, the CP 120 may be a multi-Virtual Machine Virtual Network Function (multi-VM VNF), which may control the plurality of UPs 140 irrespective of where the plurality of UPs 140 are located and on what platform the plurality of UPs 140 are hosted. Therefore, the CP 120 may control any mix of different types of the plurality of UPs 140. In various embodiments, the CP 120 and the plurality of UPs 140 may communicate through an $S_X$ protocol 160.

In various embodiments, the CP 120 may aggregate/consolidate statistics or bulk-statistics (e.g., to report VNF/Node level statistics, PDN level statistics, Quality of Service Class Index and Allocation and Retention Priority (QCI+ARP) level statistics, and flow level statistics). In various embodiments, the CP 120 may aggregate node level configuration information (e.g., idle timeout, bearer inactivity timeout, configuration of static rules, predefined rules, source violation or APN profile). In various embodiments, the CP 120 may aggregate ADC/Tethering detection information, recovery/restoration information, monitor protocol/subscriber trace information for lawful interception. In various embodiments, the CP 120 may aggregate L2 marking parameters, DSCP marking of General Packet Radio Service's (GPRS) Tunneling Protocol-U (GTPU) echo, or push needed node configuration (e.g., predefined/static rules, APN profile info, ACL info, etc.) for all the UPs it controls. In various embodiments, the CP 120 and the plurality of UPs 140 may interact via the $S_X$ protocol 160, various extensions of $S_X$ protocols, or additional private extensions based on specific needs of the network.

The plurality of UPs 140 may result from a Control User Plane Separation (CUPS) of an EPC. In some embodiments, the CP 120 may manage hundreds of UPs in a same data center, while in some other embodiments, the CP 120 and the UPs 140a, 140b, and 140c may be geographically far apart and spread out.

In various embodiments, the network system 100 may automatically separate the plurality of UPs 140. The network may further form a plurality of UP groups 150a, 150b, and 150c and subsequently allocate each of the UPs 140a, 140b, or 140c to a UP group. In various embodiments, hundreds of UPs may be allocated to two or more UP groups in such manner that each UP group may include one or more UPs.

In operation, UPs may be allocated to UP groups based on a set of features. In some embodiments, the set of features may be a capability character of the UPs. As an example, and not by way of limitations, the UPs may be allocated to a UP group based on their Stateful and/or Deep Packet Inspection (SPI/DPI) capability. In those instances, UPs which can support SPI/DPI may be allocated to the same UP group. As another example, and not by way of limitations, UPs may be allocated to a UP group based on their platform type.

In various embodiments, UPs may be allocated to UP groups based on their Access Point Name (APN). In some other embodiments, UPs may be allocated to UP groups based on their location. In yet some other embodiments, UPs may be allocated to UP groups based on Slice ID or Remote Access Trojan (RAT) type. In various embodiments, a combination of the above sets of features may be used to allocate UPs to UP groups. The system 100 may further allocate UPs to UP groups based on static selection of available active UPs. The UP groups may enable the network operator to scale UP and CP independently.

In various embodiments, UP grouping through CUPS may enhance throughput per PDN and reduce state distribution. Further, UP grouping may provide the network operator with flexibility to have different UP for different applications. Moreover, UP groups may allow managing the whole life cycle of remote UPs centrally from a CP even if some UPs are located far apart, in a remote data center or Radio Access Network (RAN) edge. This may minimize required resources to deploy UP in a RAN or access points.

Allocating UPs in UP groups may simplify UP discovery while decreasing UP configuration costs and complexity. In various embodiments, allocating UPs in UP groups may further provide a mechanism by which a UP can be registered to a CP in zero touch manner (without any need for configuration on CP). In various embodiments, a set of UPs may explicitly be configured and allocated to a specific UP group in the plurality of UP groups 150. The specific UP grouping may enable the network operator to reserve a specific set of UP groups for a specific purpose. In various embodiments, there may be one or more specific UP groups. In various embodiments, UPs that are not explicitly configured and hence are not registered in any specific UP group, may be allocated to a default UP group UPs may be allocated to the default UP group in a zero-touch manner without having the need to explicitly being configured on a CP. In various embodiments, the CP may have a default UP group which may include the UPs that are dynamically discovered. The default UP group may further be used to serve the APNs associated with it. The default group may be more suited for co-located instances, where all the UPs are of the same capacity and capability and are in the same data center. In some embodiments, specific UP groups may have explicit UPs configured to be part of the UP group. In some embodiments, an APN may be served by default and/or multiple or single specific UP groups, which may reduce the UP specific configuration required on the CP, thus simplifying the overall configuration on the CP and providing an option to network operators to associate specific UPs to particular APNs.

In various embodiments, in order to avoid an unauthorized UP to register to a CP, a secret key may be used for authentication between the CP and the UP to ensure that the UP is an authorized UP. The UP is required to be associated with a secret key to be registered to the CP. In case a secret key does not accompany a UP, the UP may be denied registration to a CP.

In various embodiments, as a result of UP grouping, some node level application configuration may be pushed from the CP to the UP. As an example, and not by way of limitations, Access Control Lists (ACLs), predefined Path Computation Client (PCC) rules, static rules, idle timer, bearer inactivity timer, source violation and some other APN profile configurations may be pushed to the UP. Moreover, in some embodiments, a CP may cater to several APNs, but a UP may serve only few of the APNs. Therefore, the CP may have to ensure the UP only gets the configuration for APNs that serves the UP, rather than getting the configuration for all the APNs, which may optimize the configuration that needs to be provisioned on the UP and optimizing the resources on the UP. In various embodiments, the $S_X$ protocol 160 may be extended to carry the configuration from the CP to the UP. In various embodiments, the $S_X$ protocol may be extended to carry the UP messages and events to the CP on request from the CP, therefore the CP can become a single point debugging function, which may improve debugging and analysis. In various embodiments, the $S_X$ protocol may be further extended to carry additional information needed for customer specific features.

In various embodiments, an APN can be associated with multiple UP groups. If no group is associated with an APN, then the default UP group is used to serve that APN. For a new PDN connection UP will be selected in a round-robin manner from the UP group or across multiple UP groups associated with that APN. In various embodiments, a UP redundancy type may be configured as part of the UP group. The UP redundancy can be of 1:1 or N:M type. The Type of redundancy applied to a UP depends on which UP group it belongs, and the redundancy type configured in that UP group.

In various embodiments, the system may use a Vector Packet Processor (VPP), which is an extensible framework for forwarding component. This may enable the system to support multi-Gbps per session peak data rates. The UP may further be capable to support 5G peak data rates.

In various embodiments, a mix of Inter-Chassis Session Redundancy (ICSR) for the CP and N:M/1:1 redundancy mechanism for the UPs may be provided, which may be used for in-service upgrades or downgrades.

Figure 2A:
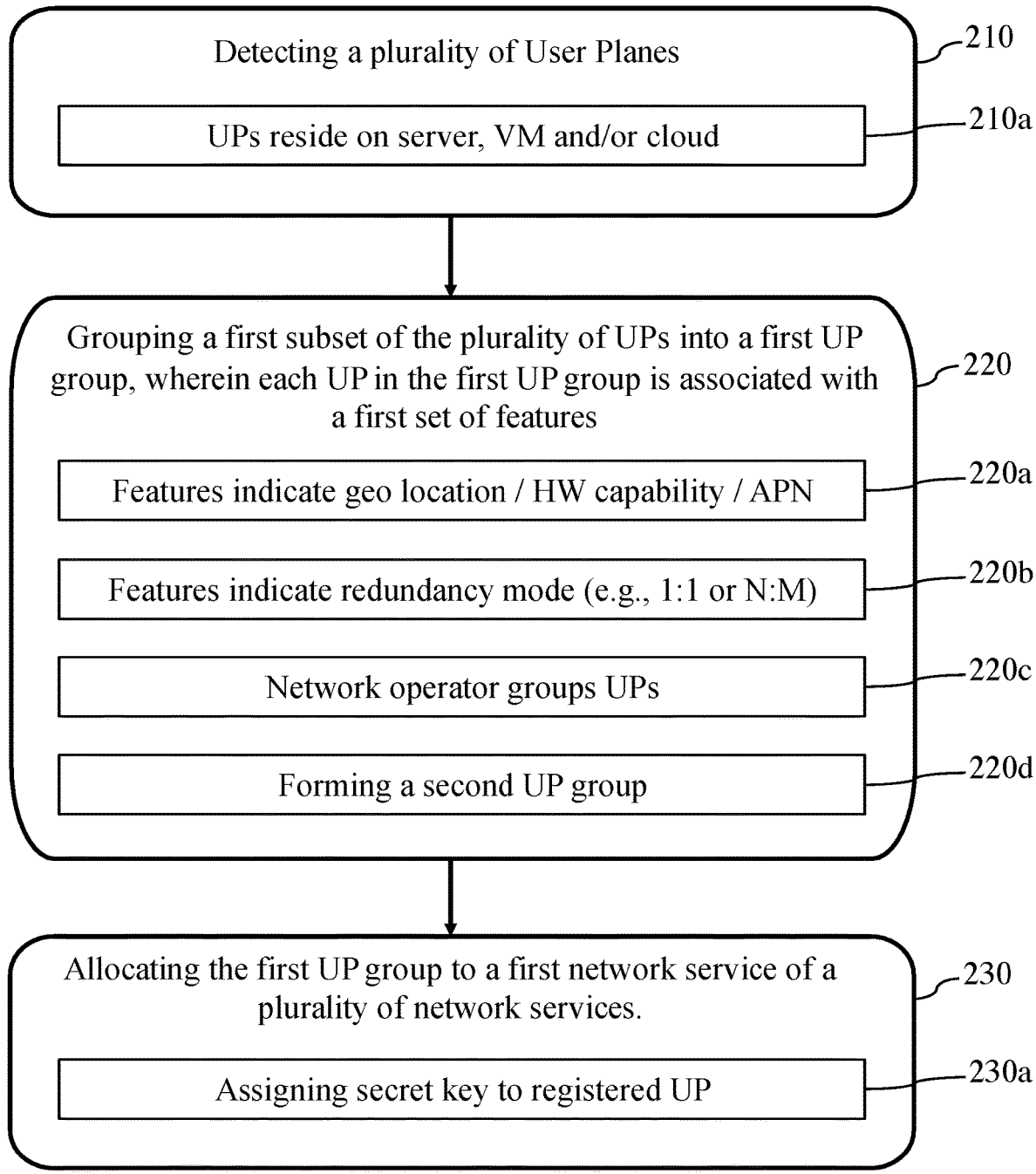
FIGS. 2A & 2B are flowchart representations of a method of grouping a plurality of detected UPs based on sets of features in accordance with some embodiments.

FIG. 2A is a flowchart representation of a method for UP group selection 200 of the present application. As illustrated by block 210, in some embodiments, the system for UP group selection may detect a plurality of User Planes (UPs). In various embodiments, the UPs reside on servers, on Virtual Machines (VM) or on a cloud space, as shown in block 210a. As illustrated by block 220, in some embodiments, the system for UP group selection may group a first subset of the plurality of UPs into a first UP group. Each UP in the first UP group may be associated with a first set of features. In some embodiments, as represented by block 220a, the set of features indicate geographical locations of the UPs, hardware capability of the UPs or an APN associated with the UPs. In various embodiments and as represented by block 220b, the set of features indicate redundancy mode of UPs. As an example, the redundancy mode may be 1:1 or N:M. As shown in block 220c, in some embodiments, the network operator is able to group UPs based on a first set of features. In some embodiments, the method for UP group selection 200 further incudes forming a second UP group based on a second set of features, as depicted by block 220d. As illustrated by block 230, in some embodiments, the system for UP group selection may allocate the first UP group to a first network service of a plurality of network services. As an example, and not by way of limitations, a plurality of network services may include a Voice over LTE (VoLTE) or an Internet application. In various embodiments, the system may allocate a first subset of UPs to the first UP group based on the first set of features associated with the first UP group and a first set of requirements of the first network service. As an example, and not by way of limitations, VoLTE has a low latency requirement, therefore the first UP group is allocated to APN for VoLTE if the first UP group can satisfy the low latency requirement. In some embodiments, the UP group may be configured with the list of UPs identified by their $S_X$ IPv4 or IPv6 transport IP Address (e.g., the Node ID). In some embodiments, the UP group may be configured with the redundancy mode for the UP group to be either 1:1 or N:M. As an example, and not by way of limitations, N:M redundancy may be used to configure number of standby UPs or explicitly configure the IP Address of Standby. As another example, and not by way of limitations, 1:1 redundancy may be used to explicitly configure the IP Address of Standby. In some embodiments, in order to avoid an unauthorized UP to register to the CP, a secret key will be assigned to each UP for authentication between the CP and the UP, as represented by block 230a. Using this secret key, the CP will authorize the UP to ensure that it is an authorized UP.

Figure 2B:
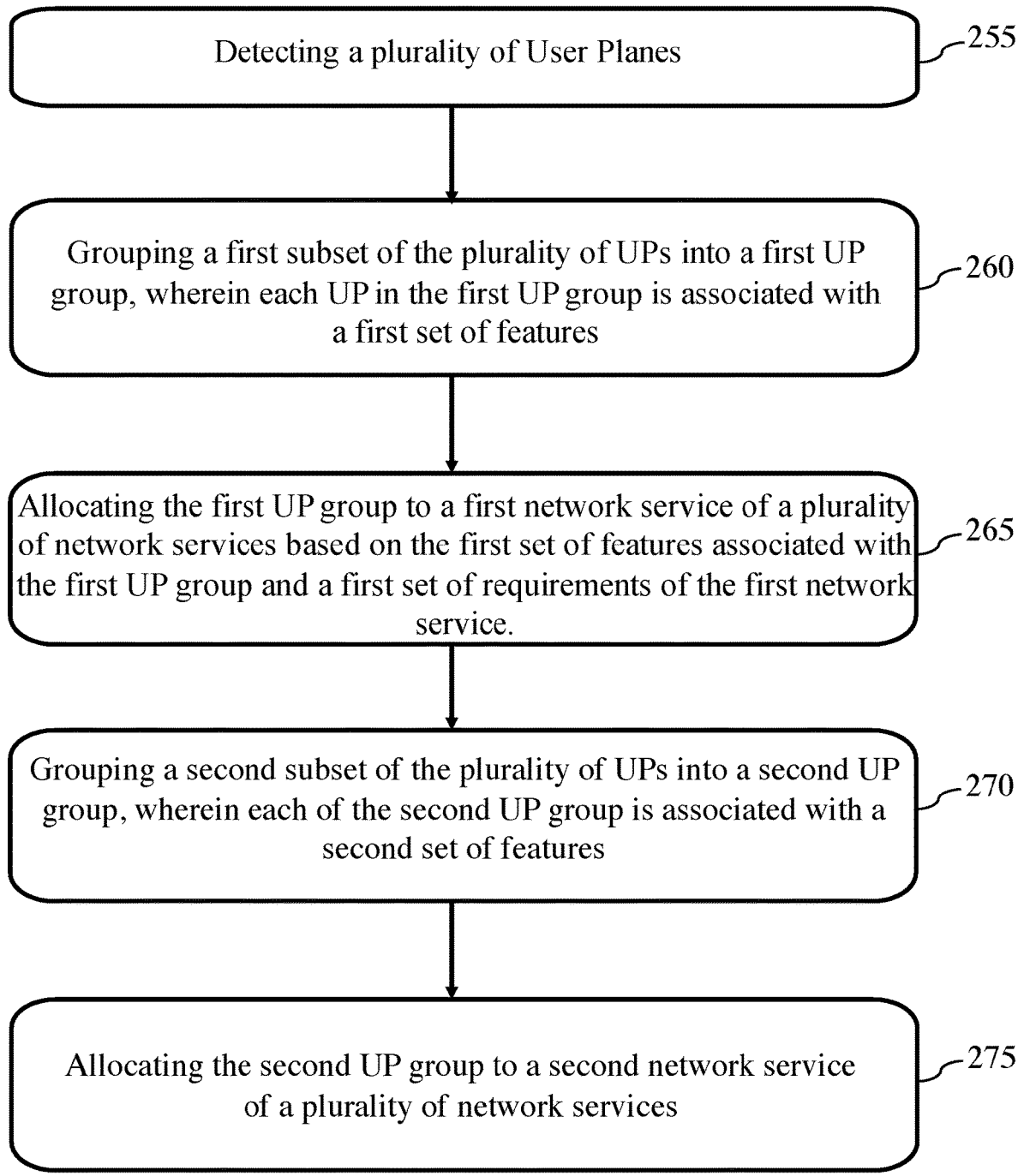

FIG. 2B is a flowchart representation of a method for selecting UP groups 250 in accordance with some embodiments of the present application. As illustrated by block 255, in some embodiments, the system for UP group selection may detect a plurality of User Planes (UPs). In various embodiments, the UPs reside on servers, on Virtual Machines (VM) or on a cloud space. As illustrated by block 260, in some embodiments, the system for UP group selection may group a first subset of the plurality of UPs into a first UP group. Each UP in the first UP group may be associated with a first set of features. In some embodiments, the set of features indicate geographical locations of the UPs, hardware capability of the UPs or an APN associated with the UPs. In various embodiments, the set of features indicate redundancy mode of UPs. As an example, the redundancy mode may be 1:1 or N:M. In some embodiments, the network operator is able to group UPs based on a set of features. As illustrated by block 265, in some embodiments, the system for UP group selection may allocate the first UP group to a first network service based on the first set of features associated with the first UP group and a first set of requirements of the first network service. The method for UP group selection 250 further includes grouping a second subset of the plurality of UPs into a second UP group, as shown in block 270. In various embodiments, the second UP group is associated with a second set of features. As illustrated by block 275, in some embodiments, the system for UP group selection may allocate the second UP group to a second network service of a plurality of network services. As an example, and not by way of limitations, a plurality of network services may include a Voice over LTE (VoLTE) or an Internet application. In various embodiments, the system for UP group selection may allocate the first UP group based on the first set of features associated with the first UP group and a first set of requirements of the first network service. As an example, and not by way of limitations, VoLTE has a low latency requirement, therefore the first UP group is allocated to the APN for VoLTE if the first UP group can satisfy the low latency requirement. In some embodiments, the UP group may be configured with the list of UPs identified by their $S_X$ IPv4 or IPv6 transport IP Address (e.g., the Node ID). In some embodiments, the UP group may be configured with the redundancy mode for the UP group to be either 1:1 or N:M. As an example, and not by way of limitations, N:M redundancy may be used to configure the number of standby or explicitly configure the IP Address of Standby. As another example, and not by way of limitations, 1:1 redundancy may be used to explicitly configure the IP Address of Standby. In some embodiments, in order to avoid an unauthorized UP to register to the CP, a secret key will be assigned to each UP for authentication between the CP and the UP. Using this secret key, the CP will authorize the UP to ensure that it is an authorized UP.

Figure 3:
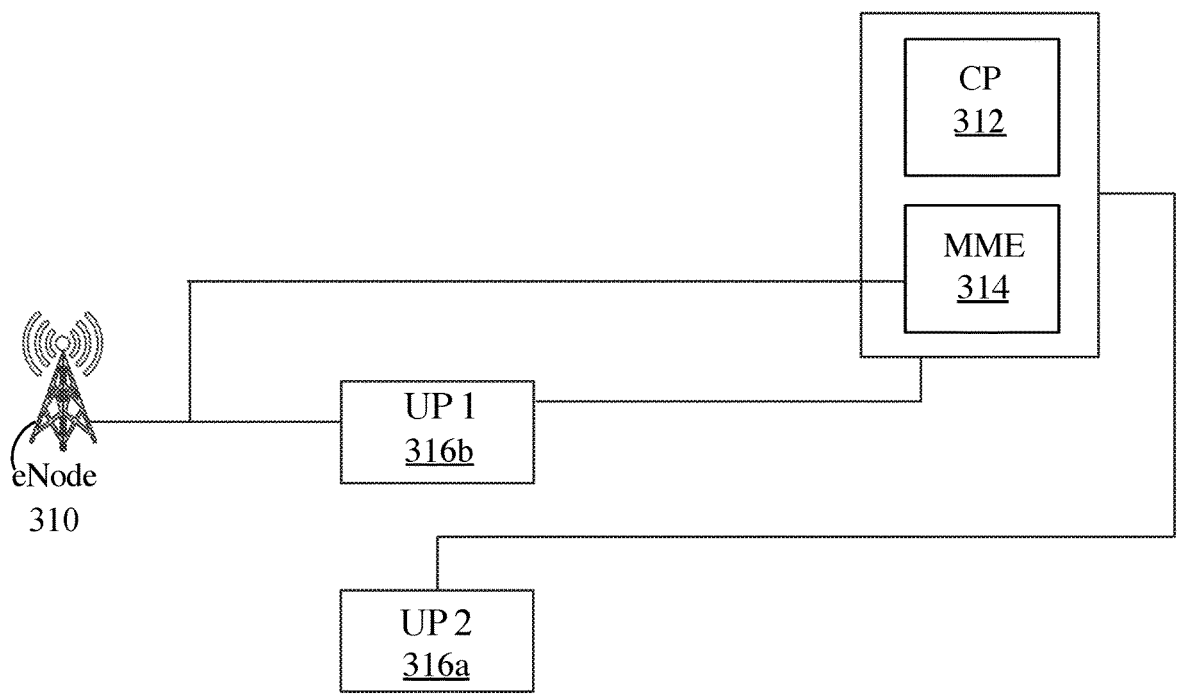
FIG. 3 is a block diagram of a system of UP groups in which the UPs and Control Planes (CP) are geographically distant in accordance with some embodiments.

In various embodiments, the UPs may be co-located with the CP in the same data center, as in FIG. 1, or may be located remotely in a different data center, as shown in FIG. 3. Referring to FIG. 3, in some embodiments, the system for UP group selection 300 may include a CP 312 and an MME 314 associated with the CP 312, and a plurality of UPs UP1 316a and UP2 316b. In some embodiments, the CP 312 and the UPs 316a and 316b may be deployed to geographically-distant data centers, far from an evolved Node 310. Remotely deploying the UPs function may allow a network operator to continue to operate the network as a single EPC gateway, while the UPs capability is in the vicinity of traffic termination points. By locating a UP at key aggregation or termination points, the amount of traffic the network operator may need to backhaul to a central location may change, which may be used in enterprise and IoT use cases where large volumes of traffic terminate at given customer locations. In various embodiments, mobile edge computing requirement may be addressed when the UPs are located remotely from the CP. In various embodiments, the CP may be able to control both co-located UPs and remote UPs simultaneously, thus providing flexibility to have a mix of different types of UPs controlled by the same CP.

Figure 4A:
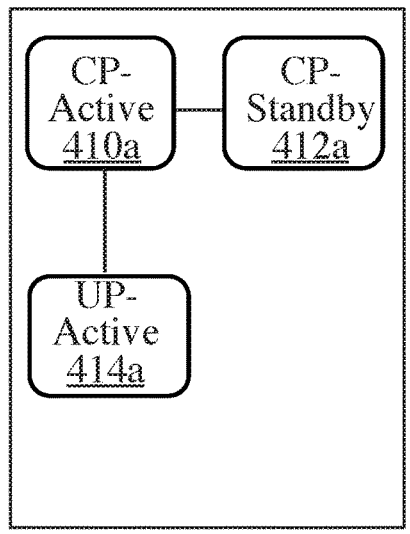
FIGS. 4A-4C illustrate different redundancies in a UP group in accordance with some embodiments.
Figure 4B:
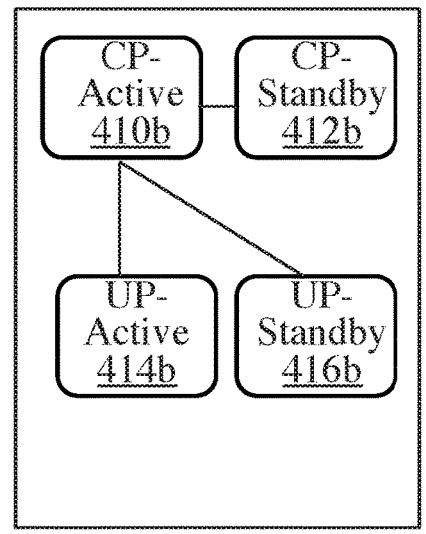
Figure 4C:
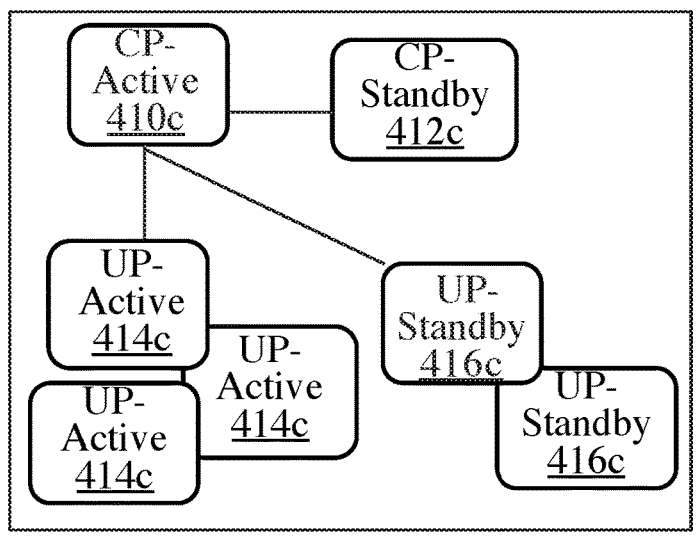

FIGS. 4A-4C illustrate different redundancy modes 400 in a UP group in accordance with some embodiments of the present application. In various embodiments, the disclosed system may support redundancy features such as, but not limited to: session recovery in both the CP and the UP, ICSR support for the CP (including CP-Active 410a associated with a UP-Active 414a and a CP-standby 412a), 1:1 and N:M redundancy for UPs (shown in FIGS. 4B and 4C, respectively). In 1:1 redundancy mode, for each active UP 414b, there is a standby UP 416b. Both UPs 414b and 416b are associated with an active CP 410b which is further associated with a standby CP 412b. In N:M redundancy mode, an active CP 410c is associated with a standby CP 412c. Further, for N number of active UPs (UP-Active 414c in FIG. 4C) there are M standby UPs (shown by UP-Standby 416c in FIG. 4C). In various embodiments, M and N are not the same numbers. In various embodiments, different redundancy for different UP groups may be determined based on the needs of the application. As an example, and not by way of limitations, when an operator has one UP group for IMS and another UP group for Internet to keep IMS and Internet traffic separate, the operator may configure 1:1 redundancy for UPs in IMS UP group for better resiliency, while for Internet P group N:M redundancy may be configured.

Figure 5:
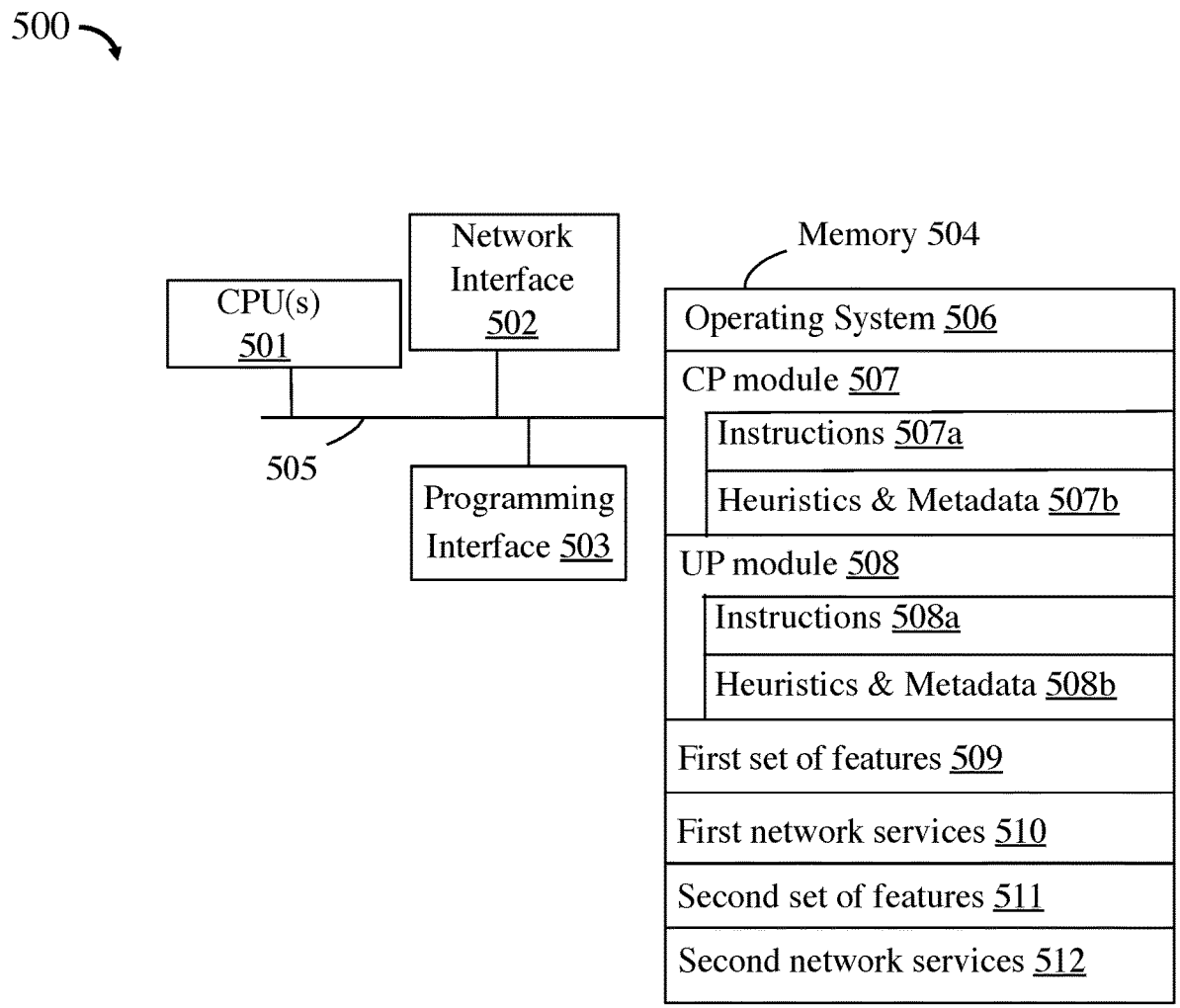
FIG. 5 is a block diagram of a server system enabled with UP group selection in accordance with some embodiments.

FIG. 5 is a block diagram of a server system 500 enabled with various modules associated with and/or included in a UP group selection in accordance with some embodiments. In other words, in some embodiments, the server system 500 implements a UP group selection. While certain specific features are illustrated, those of ordinary skill in the art will appreciate from the present disclosure that various other features have not been illustrated for the sake of brevity, and so as not to obscure more pertinent aspects of the embodiments disclosed herein. To that end, as a non-limiting example, in some embodiments the server system 500 includes one or more processing units (CPUs) 501, a network interface 502, a programming interface 503, a memory 504, and one or more communication buses 505 for interconnecting these and various other components.

In some embodiments, the network interface 502 is provided to, among other uses, establish and maintain a metadata tunnel between a cloud-hosted network management system and at least one private network including one or more compliant devices. In some embodiments, the one or more communication buses 505 include circuitry that interconnects and controls communications between system components. The memory 504 includes high-speed speed random-access memory, such as DRAM, SRAM, DDR RAM or other random-access solid-state memory devices, and may include non-volatile memory, such as one or more magnetic disk storage devices, optical disk storage devices, flash memory devices, or other non-volatile solid-state storage devices. The memory 504 optionally includes one or more storage devices remotely located from the one or more CPUs 501. The memory 504 comprises a non-transitory computer readable storage medium.

In some embodiments, the memory 504 or the non-transitory computer readable storage medium of the memory 504 stores the following programs, modules and data structures, or a subset thereof including an optional operating system 506, a CP module 507, a UP module 508, a first set of features 509, a first network service 510, a second set of features 511 and a second network service 512. In various embodiments, the UP module 508 and the CP module 507 perform substantially the same operations as the UP module 140, and the CP module 120, respectively, shown in FIG. 1. To that end, in various embodiments, the memory 504 includes instructions and/or logic 507a and 508a, and heuristics and metadata 507b and 508b that are associated with the CP module 507 and the UP module 508.

The operating system 506 includes procedures for handling various basic system services and for performing hardware dependent tasks.

In various embodiments, the UP module 508 may detect a plurality of UPs and further group a first subset of the plurality of UPs into a first UP group. Each UP in the first UP group may be associated with a first set of features. In various embodiments, the system may allocate the first UP group to a first network service of a plurality of network services. For example, in various embodiments, where the network has hundreds of UPs in the network, it is necessary to simplify the CP discovery. The lesser the amount of configuration for UP association in the CP the better it is. Hence, the UP module 508 may support a mechanism by which a UP can be registered to a CP in a zero-touch manner to the CP without any need for any configuration on the CP for that UP. The CP may have a default UP group which may have all the UPs that are dynamically discovered. The default group of UPs will be then used to serve the APNs that have the default UP group associated with the APNs. Specific UP groups can have explicit UPs configured to be part of that group. An APN can be served by default and/or multiple/single specific UP groups, which may reduce the UP-specific configuration needed on the CP and thus simplifying configuration on the CP as well as providing the option to operators to associate specific UPs to particular APNs.

In various embodiments, as the UPs are grouped to UP groups and as a result of reduced UP configuration, the rest of the node-level application configuration (such as ACLs, predefined PCC rules, static rules, idle timer, bearer inactivity timer, source violation) is pushed from the CP to the UP. For example, a CP may cater to several APNs, but a UP might service only few of the APNs, so the CP will ensure that the UP only gets the configuration for the APNs that it is serving, rather than getting the configuration for all the APNs. This will reduce the amount of configuration that needs to be provisioned on the UP and therefore reduces the resources on the UP.

In various embodiments, the CP may support 3GPP features such as 3GPP compliant CUPS CP, Terminate S5/S8/S2a/S2b/Gn/Gp/S11 GTPC interfaces. Terminate Gx/Gy/Gz/S6b interfaces, LI interface X1/X2/X3, charging records generation, bearer binding support and DNS based CUPS UP selection.

Moreover, various embodiments support session recovery, which is the ability to recover session due to task crash in the VNF. Various embodiments and similar to the ICSR support in monolithic EPC Gateway, node level recovery is supported between an active CP and a hot standby CP. In various embodiments, monitor protocol/subscriber trace to trace all the messages of a particular protocol/subscriber type on the whole VNF is enabled. Various embodiments enable the network operator to static and dynamic CUPS UP selection and to intelligently manage the IP pools by CP, so that the CP can efficiently manage the IP pool resources and simplify the IP pool configuration on the EPC Gateway.

In various embodiments, PCC rule activation/deactivation/update and SPI/DPI feature control are enabled. Moreover, in various embodiments, VoLTE value add features are provided.

In various embodiments, the UP may support 3GPP features such as 3GPP compliant CUPS UP, S5/S8/S2a/S2b/Gn/Gp/S1 GTPU interfaces, and Sxa, Sxb and Sxab interface. Moreover, the UP may support flow-based data rate enforcement, DSCP marking, and Lawful intercept Data intercept duplication to CUPS CP.

In various embodiments, the UP may be able to recover session due to task crash in the VNF. In various embodiments, 1:1 redundancy is supported. For example, with this feature an active UP has a hot standby UP, which is programed in real time with session state info, ready to take over when the active UP fails. In various embodiments, an N:M redundancy may be supported. For example, with this feature for N active UP there are M Standby UPs where N>M most of the times. In this case a Standby UP is programed to takeover a failed UP only when the failure is detected. In this case since the state information recovery is started only on detection of failure, then it could take longer for a Standby to takeover.

Various embodiments may provide support for SPI/DPI packet inspection support, NAT/Firewall, and ADC/Tethering detection.

Various embodiments will support UP selection in three phases. Phase 1, Static selection: This is based on static selection of available active UPs. UP group concept is used for static UP selection. The UP group is a group of UPs. Each APN is associated with one or more UP groups. The APN is served by the UP groups associated with that APN. The UPs are selected in round robin manner from all the UP groups associated with that APN. Phase 2, DNS based selection: This is based on the way 3GPP suggests the UP selection using DNS based selection. With this the network operator can create an APN or Location of Fully Qualified Domain Name (FQDN), which is then resolved to select a UP. Phase 3, Dynamic UP selection: In this phase, the UP selection is done based on either one or combination of the following parameters: APN name, Location, Load, UP capabilities such as SPI/DPI support or Platform type, Slice ID, and RAT type. In various embodiments, dynamic UP selection may make use of NSS (Node and Slice Selection) function, on the lines of Network Repository Function (NRF) node in 5G SA architecture.

In various embodiments, on the CP and for Static UP selection, the UP group concept is used. A UP group is a list of UPs. A UP can be part of only one UP group. In a UP group all the UPs need to be of same capacity and capability. Different type of UPs should be part of different UP groups. Two types of UP groups that are supported are default UP group and specific UP group. The specific UP group is a set of explicitly configured UPs. The specific group gives the flexibility to group certain specific types of UPs together. This flexibility helps in reserving specific set of UPs for a specific purpose. Multiple specific groups can be configured. The default UP group is a group for all the UPs that are registered and are not explicitly configured as part of any specific UP group. The default group has feature of registering UPs in zero touch manner without having the need to explicitly configure a UP on the CP. This kind of group may be more suited for collocated CUPS case where all the UPs are of same capacity and capability and are in the same data center. The default group reduces the UP configuration on the CP. In order to avoid an unauthorized UP to register to the CP a secret key may be used for authentication between the CP and the UP. Using this secret key, the CP may authorize the UP to ensure that the UP is authorized. In various embodiments, an APN can be associated with multiple UP groups. If no any group is associated with an APN, then the default UP group is used to serve the APN. For a new PDN connection the UP is selected in round robin manner from the group of UPs or across multiple groups pf UPs associated with the APN. The UP redundancy type is configured as part of the UP group. The UP redundancy can be of 1:1 or N:M type.

According to various embodiments architectures, a control/user plane is decomposed into the CUPS CP and multiple CUPS UPs. This decomposition brings in some challenges with it too. For example, one of these challenges is that with multiple CUPS UPs, the IP pools needs to be assigned by the CUPS CP to each CUPS UP anchored sessions, so that the CUPS UP can accordingly advertise the routes for subscriber IP pools. Given the above, while provisioning the IP pools on the CUPS CP, the network operator would need to split the IP pools on manually and do the mapping of the IP pools with each CUPS UP. This can become complex, tedious and error prone as the number of the CUPS UPs increase. In order to overcome the above-mentioned challenge and simplify the IP pool configuration on the CUPS CP, various embodiments provide a way to manage the IP pools by managing the splitting of the IP pools in the CUPS CP itself without involving the network operator. The network operator can configure the large IP pools the similar way the network operator does that with large monolithic gateways and leaves this task to the CUPS CP. This can help simplifying the configuration and reducing the configuration time.

Various embodiments will support lawful interception in following way: 1—CP terminates X1, X2 and X3 interface. 2—UP, after registration, creates a node level IPSEC tunnel towards the CP. This IPSEC tunnel stays until UP is registered to the CP. 3—When an intercept is provisioned on the CP, the CP notifies the UP over $S_X$ to intercept the CC data for a session. 4—The UP sends the intercepted data via IPSEC tunnel to the CP. If there are multiple sessions being intercepted the same IPSEC tunnel is shared for all the sessions. 5—Once the intercept is disabled on the CP, the CP notifies the UP to stop the intercept accordingly.

Various embodiments support inline services or different SPI/DPI capabilities. An example is the ability to integrate traffic steering framework, so that Gi-LAN services can be done using any 3rd Party applications (such as Firewall, Video Optimization, DPI, NAT and others).

While various aspects of embodiments within the scope of the appended claims are described above, it should be apparent that the various features of embodiments described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first", "second", etc. may be used herein to describe various elements, these elements should not be limited by these terms. These terms are only used to distinguish one element from another. For example, a first contact could be termed a second contact, and, similarly, a second contact could be termed a first contact, which changing the meaning of the description, so long as all occurrences of the "first contact" are renamed consistently and all occurrences of the second contact are renamed consistently. The first contact and the second contact are both contacts, but they are not the same contact.

The terminology used herein is for the purpose of describing particular embodiments only and is not intended to be limiting of the claims. As used in the description of the embodiments and the appended claims, the singular forms "a", "an", and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
at a device including a non-transitory memory and a processor coupled with the non-transitory memory:
detecting a plurality of user planes (UPs);
grouping a first subset of the plurality of UPs into a first UP group, wherein each UP in the first UP group is associated with a first set of features; and
allocating the first UP group to a first network service of a plurality of network services based on the first set of features associated with the first UP group and a first set of requirements of the first network service, wherein at least one UP of the first UP group is registered to a control plane (CP).

2. The method of claim 1, wherein the first set of features indicate respective geographical locations of the plurality of UPs.

3. The method of claim 1, wherein the first set of features indicate respective capabilities of the plurality of UPs.

4. The method of claim 1, wherein the first set of features indicate respective Access Point Name (APN) associations of the plurality of UPs.

5. The method of claim 1, wherein the first set of features indicate a redundancy mode, wherein the redundancy mode includes one of: a 1:1 redundancy mode and an N:M redundancy mode.

6. The method of claim 1, wherein the device includes a network operator device.

7. The method of claim 1, further comprising assigning a secret key to the at least one UP of the the first UP group, wherein the at least one UP utilizes the secret key to register to the CP.

8. The method of claim 1, wherein each of the plurality of UPs resides on one or more of: a server, a virtual machine and a distributed cloud platform.

9. The method of claim 1, further comprising:
grouping a second subset of the plurality of UPs into a second UP group, wherein each of the second UP group is associated with a second set of features; and
allocating the second UP group to a second network service of the plurality of network services.

10. The method of claim 1, further comprising:
wherein the at least one UP of the UP first UP group obtains configuration information from the CP for at least one Access Point Name (APN) to which the first UP group is allocated.

11. A non-transitory computer storage that stores executable program instructions that, when executed by one or more computing devices, configure the one or more computing devices to:
- detect a plurality of User Planes (UPs);
- group a first subset of the plurality of UPs into a first UP group, wherein each UP in the first UP group is associated with a first set of features; and
- allocate the first UP group to a first network service of a plurality of network services based on the first set of features associated with the first UP group and a first set of requirements of the first network service, wherein at least one UP of the first UP group is registered to a control plane (CP).

12. The non-transitory computer storage of claim 11, wherein the executable program instructions further configure the one or more computing devices to:
- group a second subset of the plurality of UPs into a second UP group, wherein each of the second UP group is associated with a second set of features; and
- allocate the second UP group to a second network service of the plurality of network services.

13. The non-transitory computer storage of claim 11, wherein the first set of features indicates respective geographical locations of the plurality of UPs.

14. The non-transitory computer storage of claim 11, wherein the first set of features indicates respective capabilities of the plurality of UPs.

15. The non-transitory computer storage of claim 11, wherein the first set of features indicates respective APN associations of the plurality of UPs.

16. The non-transitory computer storage of claim 11, wherein the first set of features indicates a redundancy mode, wherein the redundancy mode includes one of a 1:1 redundancy mode and an N:M redundancy mode.

17. The non-transitory computer storage of claim 11, wherein the one or more computing devices includes a network operator device.

18. The non-transitory computer storage of claim 11, wherein the executable program instructions further configure the one or more computing devices to:
- assign a secret key to at least one UP of the first UP group, wherein the at least one UP utilizes the secret key to register to the CP.

19. The non-transitory computer storage of claim 11, wherein each of the plurality of UPs resides on one or more of: a server, a virtual machine and a distributed cloud platform.

20. A device comprising:
- a non-transitory memory; and
- a processor coupled with the non-transitory memory for executing instructions, wherein executing the instructions causes the device to perform operations, comprising:
  - detecting a plurality of User Planes (UPs);
  - grouping a first subset of the plurality of UPs into a first UP group, wherein each UP in the first UP group is associated with a first set of features;
  - allocating the first UP group to a first network service of a plurality of network services based on the first set of features associated with the first UP group and a first set of requirements of the first network service, wherein at least one UP of the first UP group is registered to a control plane (CP);
  - grouping a remaining subset of the plurality of UPs into a second UP group; and
  - allocating the second UP group to a second network service of the plurality of network services.

* * * * *